US009663916B2

(12) United States Patent
Denker et al.

(10) Patent No.: US 9,663,916 B2
(45) Date of Patent: May 30, 2017

(54) FOUNDATION STRUCTURE OF AN OFFSHORE PLANT, IN PARTICULAR AN OFFSHORE WIND TURBINE, WHICH FOUNDATION STRUCTURE IS TO BE INSTALLED AT A LOW NOISE LEVEL, AND INSTALLATION METHOD THEREFOR

(71) Applicant: Vallourec Deutschland GmbH, Düsseldorf (DE)

(72) Inventors: Andreas Denker, Uhldingen-Mühlhofen (DE); Nico Genge, Essen (DE); Ole Josat, Leverkusen (DE); Claas Bruns, Düsseldorf (DE); Ralf Hojda, Altena (DE)

(73) Assignee: Vallourec Deutschland GmbH, Düsseldorf (DE)

( * ) Notice: Subject to any disclaimer, the term of this patent is extended or adjusted under 35 U.S.C. 154(b) by 20 days.

(21) Appl. No.: 14/376,050

(22) PCT Filed: Feb. 1, 2013

(86) PCT No.: PCT/EP2013/052031
§ 371 (c)(1),
(2) Date: Jul. 31, 2014

(87) PCT Pub. No.: WO2013/113873
PCT Pub. Date: Aug. 8, 2013

(65) Prior Publication Data
US 2014/0369766 A1    Dec. 18, 2014

(30) Foreign Application Priority Data

Feb. 3, 2012 (DE) .................. 10 2012 100 901

(51) Int. Cl.
*E02D 27/52*  (2006.01)
*E02D 27/42*  (2006.01)
(Continued)

(52) U.S. Cl.
CPC ........... *E02D 27/425* (2013.01); *E02D 27/12* (2013.01); *E02D 27/52* (2013.01); *E02D 27/525* (2013.01); *E02D 29/06* (2013.01)

(58) Field of Classification Search
CPC ........ E02D 27/12; E02D 27/14; E02D 27/16; E02D 27/425; E02D 27/52; E02D 27/525
(Continued)

(56) References Cited

U.S. PATENT DOCUMENTS 3,638,436 A * 2/1972 Pogonowski ....... E02B 17/0008
                                                        405/227
5,127,767 A * 7/1992 Plagborg-Moller .... E02B 17/00
                                                        403/228
(Continued)

FOREIGN PATENT DOCUMENTS

CN    100473824 C    4/2009
CN    201538971 U    8/2010
(Continued)

OTHER PUBLICATIONS

English translation of International Preliminary Report on Patentability from corresponding International Application PCT/EP2013/052031.
(Continued)

*Primary Examiner* — Tara M. Pinnock
(74) *Attorney, Agent, or Firm* — Gardner, Linn, Burkhart & Flory, LLP

(57) ABSTRACT

A foundation structure of an offshore plant, such as a wind turbine, comprising at least one foundation element that can be anchored to the seabed without a gravity foundation and
(Continued)

without a floating foundation and a support structure fastened thereto for fixing the offshore plant. The foundation element is a pile that can be inserted into the seabed by means of drilling and/or by means of vibratory driving, can be fixed in the seabed by means of an organic and/or inorganic material, and is oriented at an angle from a vertical on the seabed. A method of installing the foundation structure on a seabed includes first anchoring the coupling element by means of piles inserted into the seabed and then connecting the support structure to the coupling element.

26 Claims, 8 Drawing Sheets

(51) Int. Cl.
    *E02D 27/12*     (2006.01)
    *E02D 29/09*     (2006.01)

(58) Field of Classification Search
    USPC .................................................. 405/224–228
    See application file for complete search history.

(56) References Cited

U.S. PATENT DOCUMENTS

| | | | | |
|---|---|---|---|---|
| 6,659,691 | B1 * | 12/2003 | Berry | ................ E02D 27/34 405/231 |
| 8,215,874 | B2 * | 7/2012 | Reeves | ................ E02D 13/04 405/227 |
| 2008/0028715 | A1 | 2/2008 | Foss et al. | |
| 2010/0031589 | A1 * | 2/2010 | Fernald | ................ E02D 27/42 52/173.1 |
| 2011/0061321 | A1 | 3/2011 | Phuly | |
| 2011/0293379 | A1 | 12/2011 | Halkyard et al. | |

FOREIGN PATENT DOCUMENTS

| | | |
|---|---|---|
| CN | 102337746 A | 2/2012 |
| DE | 202011101599 U1 | 11/2011 |
| DE | 202010010094 U1 | 1/2012 |
| EP | 1673536 A1 | 6/2006 |
| EP | 2067913 A2 | 1/2008 |
| GB | 880467 | 10/1961 |
| JP | 2003206852 | 7/2003 |
| JP | 2006348526 A | 12/2006 |
| JP | 2007284911 | 1/2007 |
| WO | 2005040605 A1 | 5/2005 |
| WO | 2011030167 A1 | 3/2011 |
| WO | 2011150335 A2 | 12/2011 |

OTHER PUBLICATIONS

Written Opinion of the International Searching Authority for International Application No. PCT/EP2013/052031.

English Translation of International Search Report completed Nov. 8, 2013, from corresponding International Application No. PCT/EP2013/052031.

* cited by examiner

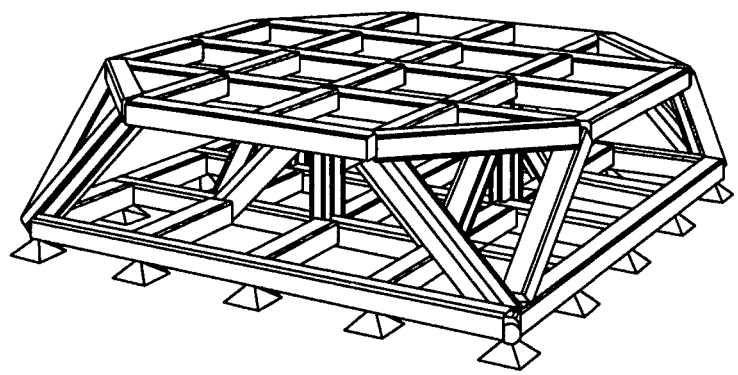
Fig. 7
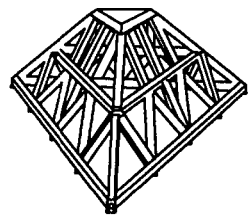    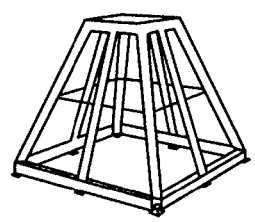    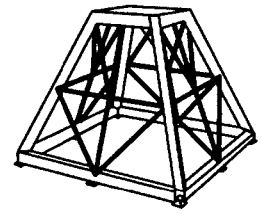
Fig. 8        Fig. 9        Fig. 10

FOUNDATION STRUCTURE OF AN OFFSHORE PLANT, IN PARTICULAR AN OFFSHORE WIND TURBINE, WHICH FOUNDATION STRUCTURE IS TO BE INSTALLED AT A LOW NOISE LEVEL, AND INSTALLATION METHOD THEREFOR

CROSS REFERENCE TO RELATED APPLICATION

The present application claims the priority benefits of International Patent Application No. PCT/EP2013/052031, filed on Feb. 1, 2013, and claims benefit of DE 10 2012 100 901.5, filed on Feb. 3, 2012.

BACKGROUND OF THE INVENTION

Foundation structure, which can be installed with a low level of noise, for an offshore plant, in particular an offshore wind energy plant, and assembly method therefor.

The present invention relates to a foundation structure for an offshore plant, in particular an offshore wind energy plant, having at least one foundation element which can be anchored to the sea floor, precluding a gravity foundation and precluding a floating foundation, and a support structure which can be attached thereto to fix the offshore plant. The invention also relates to a method for assembling this foundation structure on a sea floor.

In the context of the present invention, the term 'offshore plants' encompass offshore platforms and offshore wind energy plants. Offshore platforms also include so called drilling islands. Generally known foundations for offshore plants, in particular offshore wind energy plants (OWEPs), can be divided into two construction areas. The first construction area is a support structure which is highly subject to fatigue and which begins on the sea floor and has its end reaching the tower of the OWEP at a flange connection. The flange connection supports the tower and a turbine of the OWEP and dissipates the loads and effects produced thereby. The second construction area is a foundation element which receives the loads arising from the support structure, the tower and the wind turbine, dissipates them into the floor and is located in the sea floor below the support structure. The OWEP as a whole therefore consists of the foundation with the foundation element and the support structure and the tower and the turbine.

In order to provide a foundation for an OWEP in the sea floor the use of so-called piles as foundation elements is known from DE 20 2010 010 094 U1, these foundation elements having a diameter of about 1.5 m to about 6 m depending on the construction. The number of piles used is dependent on the support structure concerned. According to the current state of the art, various steel constructions are known as support structures, being provided with a foundation of piles: monopile, jacket, tripile and tripod.

A jacket support structure known from EP 2 067 913 A2 is attached to the sea floor by four piles, while tripiles and tripods require piles with a larger diameter. For a monopile, a single pile will suffice if it has a substantially larger diameter than other foundations. Furthermore, from the document DE 20 2011 101 599 U1 a hexagonal support structure is known, having a foundation of six piles.

Depending on the construction and the properties of the floor, the piles are driven up to 65 metres down into the sea floor. They have a weight of about 220 to 700 tonnes depending on the properties of the floor and the support structure selected. The lower ends of the support structure, the support structure feet, can be connected to the foundation piles in such a way that the feet of the support structure are pushed into the driven foundation piles which have a larger diameter. The foundation pile and support structure foot are then connected to each other e.g. by a special cement mixture (grout compound).

In addition to the foundation option using piles, gravity foundations are also known as foundations for offshore wind energy plants from DE 10 2010 012 094 B3. These consist of reinforced concrete and can weigh up to about 7000 tonnes.

Furthermore, from the international patent application WO 2011/030167 A1, attachment of turbines in tidal power generation plants below sea level by means of grouted piles bored vertically into the sea floor is known. The use of grouted piles in relation to offshore wind energy plants is described in the American patent application US 2011/0061321 A1. However, the grouted piles are used together with a gravity foundation as a kind of hybrid solution.

Furthermore, the British patent GB 880 467 describes the use of a driven piles to attach lattice mast-like foundation structures to the sea floor. The American patent application US 2011/0293379 A1 discloses lattice mast-like anchoring structures which are connected to the sea floor by means of grouted piles and to which mooring lines for floating offshore plants are connected in the manner of a floating foundation.

The approval process for erecting offshore wind farms has a profound influence on the selection of the techniques to be used offshore. In Germany, the Bundesamt fur Seeschifffahrt and Hydrografie (BSH) is responsible for the approval process. In addition, the Bundesamt fur Naturschutz (BfN) enters the approval process whenever questions and conflicts arise in relation to environmental protection.

With respect to the support structures and foundation elements, it is decided during the approval process, whether the operator's proposed construction formed from a foundation element and support structure can be used. Environmentally significant considerations and also technical requirements are of significance in the decision-making process. In designing OWEPs, attention is paid in particular to the most environmentally friendly solutions possible, which avoid or reduce sealing of the sea floor.

There are currently essentially six different foundation structures, monopile, gravity foundation, tripod, tripile, jacket and a floating anchorage, which compete with each other depending on the depth of the water. With the exception of the gravity foundations, all structures are usually provided with pile foundations. The heavy pile hammers used for the pile-driving process cause considerable sound emissions and shaking emissions. These emissions are output both in the air and also in the water and are to the considerable detriment of the natural world and the environment.

Endangered species include, amongst others, fish stocks, common seals and grey seals, whales and porpoises and sea floor fauna (benthos). The limit for acoustic pressure is currently 160 dB at 750 m from the source of the emission. However, this value is generally clearly exceeded during pile-driving.

Owing to the impact on the marine environment, wind farm operators and installation companies are obliged to use sound-damping measures during pile-driving work.

However, these are currently still in the trial phase. So-called quenching water, amongst other things, is used. However, it is not yet clear whether the sound damping is sufficient to remain below the limit value. Furthermore, quenching water is affected by sea currents so that its sound-damping effect is reduced. The use of quenching water is also time-consuming and expensive and is therefore uneconomical.

Gravity foundations are also critically evaluated with respect to environmental compatibility. Gravity foundations are produced from reinforced concrete and—owing to their shape and operating principle—take up a very large amount of surface area compared with other solutions and seal the sea floor in the region of the foundation, the sea floor then being no longer usable to sea floor fauna and flora. In addition, such foundations require elaborate and time-consuming preparation of the sea floor. Therefore, foundations using piles and no gravity foundations are generally provided in offshore wind energy plants.

For static and dynamic calculations of the loading effects on the sea floor, geological investigations are also required at each potential location. These are time-consuming and expensive.

A further important point in the approval process is the assurance that the OWEPs can be removed after use. The duration of use of an OWEP is given as 20 to 25 years. After shut-down, it has to be dismantled, wherein the piles or gravity foundations have to be removed.

SUMMARY OF THE INVENTION

The object of the invention is to provide a foundation structure, which can be installed with a low level of noise, for an offshore plant, in particular an offshore wind energy plant, and assembly method therefor, this foundation structure having a high level of environmental compatibility during installation and being able to be produced in a simple and cost-effective manner.

In accordance with an embodiment of the invention, a foundation structure for an offshore plant, in particular an offshore wind energy plant, having at least one foundation element, which can be anchored to the sea floor, precluding a gravity foundation and precluding a floating foundation, and a support structure attached thereto to fix the offshore plant, which is characterised in that the foundation element is a pile which can be inserted into the sea floor by being bored and/or vibrated in, which can be fixed in the sea floor with an organic and/or inorganic material and which is oriented at an angle to the vertical on the sea floor.

With anchoring using piles which can be inserted into the sea floor by being bored or vibrated in, the present invention contains a cost-effective, time-saving and environmentally friendly foundation structure, with which all the environmental specifications can easily be respected.

The organic and/or inorganic material is advantageously curable in order to produce rapid and permanently durable fixing of the pile in the sea floor.

In the context of the invention the expression "precluding a gravity foundation and precluding a floating foundation" is understood to mean that the foundation structure is formed as one of the following types: monopile, tripod, quadropod, tripile and jacket. The expression "at an angle to the vertical on the sea floor" is to be understood in such a way that a normal to the surface of the sea floor is meant, i.e. a straight line which is oriented at a right angle to the sea floor. Accordingly in the case of a horizontal sea floor the vertical on the sea floor is a vertical in space and in the case of a sea floor which is inclined with respect to the horizontal the vertical on the sea floor is a straight line at an angle to a vertical in space. In the case of a curved sea floor the reference is made to an appropriate tangent.

Furthermore, the term "vibrated in" is understood in terms of application of a perpendicularly downwardly directed vibration to the pile in order to create a distinction with respect to driving by application of individual strokes to a driven pile. Vibrating-in can also be referred to as vibratory pile driving.

In accordance with the present invention, a benefit is to be found in the fact that when using piles which can be inserted by being bored and/or vibrated into the sea floor it is possible to dispense with pile-driving. These piles in accordance with the invention can be inserted into the foundation site with little noise and in the most environmentally friendly manner by means of boring and/or by being vibrated in. In comparison to known solutions, the foundation structure in accordance with the invention is simpler and quicker to produce and is therefore a clearly more cost-effective solution. Noisy and time-consuming pile-driving work becomes unnecessary.

The foundation using the piles in accordance with the invention means that the permitted limit value of 160 dB is definitely not reached. While current pile-driving methods generate up to about 230 dB, with the installation of an OWEP in accordance with the present invention e.g. a noise level of only about 65 dB is emitted during boring-in of a pile into the ground, and no elaborate sound-damping solutions, such as quenching water, are thus required in the installation process. Offshore installation times can be reduced and therefore also the dependency on settled weather conditions.

The piles in accordance with the invention can be inserted into the sea floor as a foundation pile with very little noise and shaking and in a time-saving manner. The foundation pile is bored into the sea floor, wherein an annular space is produced between the borehole and pile, which can be fixed in the sea floor with a curable organic and/or inorganic material, such as e.g. a cement mortar, simultaneously-introduced or introduced after the boring process, and being filled over its whole length in the foundation site. The force to be absorbed in the operating state is transferred along the whole pile length by the composite formed by the pile and grout, wherein the load transfer into the ground is effected by pile adhesion. The number of piles required and the inclination of the piles with respect to the vertical of the sea floor is selected in dependence on the load to be dissipated and the properties of the foundation site. The piles are fixed inclined to the vertical in order to increase the load dissipation in the plane of the sea floor.

The angle of the pile to the vertical is preferably 5-85°, particularly 10 to 45°. The loads transferred into the sea floor can therefore be increased.

In a particularly advantageous manner the piles have a diameter of at least 60 mm. In one particular embodiment, the at least one pile dissipates loads into the sea floor in all spatial directions. Therefore the horizontal loads transferred into the sea floor can be further increased in comparison to piles inserted vertically.

Further advantageous provision is made in that the foundation element consists of a plurality of piles and forms a foundation system.

In order to further increase the loads which can be transferred into the sea floor, at least three piles are arranged in the sea floor in such a way that their longitudinal extensions are in three mutually diverging directions.

According to another aspect of the invention, the pile is an anchoring pile with a ribbed steel pipe as a support member, which similarly serves as a lost boring rod, as an injection pipe and as a remaining steel support member (reinforcement member). A construction steel such as e.g. S 355 J2H or S 460NH can be used as the material for the pile.

Owing to the use of the piles, the construction in accordance with the invention can withstand traction, pressure, bending and fatigue. Therefore all aero-servo-hydro-elastic forces can be absorbed and dissipated.

A further feature of the construction in accordance with the invention is the possibility of providing releasable connections which substantially simplify assembly and dismantling of the construction.

According to the current state of the art, offshore solutions must be welded together on land close to the coast and shipped from there. Owing to the size of such constructions, transportation over land is not possible, thus production must take place close to a harbour with a suitable infrastructure. This requires a high level of expensive, time-consuming, logistical input and it limits the selection of production sites to a few locations.

The invention allows the OWEP components to be easily assembled and removed by releasable connections such as screw or bayonet connections and the like. Thus the components can, up to a still-transportable size, be constructed and then brought to a loading harbour and connected to each other there or on an assembly vessel. Furthermore, by having releasable connections, the dismantling requirement becomes substantially easier and more cost-effective to fulfil.

According to one advantageous development of the invention, the piles and the support structure are connected to each other—preferably releasably—by a separate coupling element. The connection between the coupling element and support structure and the connection between the coupling element and pile can be formed in an integrally-bonded and/or non-positive and/or positive manner. For this purpose, the coupling element has corresponding connections for attachment of both the support structure and also the piles, wherein e.g. in the case of a monopile, the connection for attachment of the support structure, e.g. in the centre of the corresponding coupling element, and the connections for attachment of the piles can be disposed e.g. at the corners of the coupling element.

A further advantageous feature of the invention makes provision for the coupling element to be formed as a lattice structure element which preferably consists of pipes. The pipes can be formed as seamlessly hot-rolled and/or cold-formed pipes and/or as welded pipes produced from a hot strip and/or profiles with an open cross-section and can have the same or a different cross-sectional geometry such as a round or angular, triangular, rectangular, square or polygonal cross-section or a combination thereof as required.

Since the coupling elements must introduce the load of the wind energy plant into the pile foundation via the support structure and are therefore mechanically stressed to the highest degree, wide-ranging investigations have been carried out to determine optimum foundation structures.

The lattice structure element is accordingly advantageously formed as a three-dimensional structure depending on how it is stressed, being of a cubic design or a design as a truncated tetrahedron, a cone or truncated pyramid and with a circular, triangular, square or polygonal base surface. The lattice structure element advantageously has a Vierendeel, frame or framework structure in order to be able to dissipate the loads in an optimum manner. In the case of a circular base surface the piles are preferably arranged as a circle. If the lattice structure element has an angular base surface, corner piles are disposed in the corners, being supported on the sea floor and serving to receive the piles.

The lattice structure element is preferably produced from steel and/or cement or concrete and/or composite materials.

The production of the foundation is greatly simplified by the fact that the coupling element is laid on the sea floor before assembly of the support structure and can be anchored in the sea floor via the connections by means of the piles.

Alternatively provision can be made for the coupling element to be disposed above the sea floor, preferably at a distance between 1 and 5 m and for it to be able to be anchored in the sea floor by means of the at least one pile.

The connection between the pile and the coupling element can be effected both on the inside, outside, on both sides or centrally in the lattice structure element. According to a further advantageous feature of the invention, the corner piles of the lattice structure element, which stand on the sea floor, serve as guides for the piles so that—depending on the design of the lattice structure element—the piles can be bored or vibrated into the sea floor at an angle with respect to the vertical through the corner piles and can be grouted in the sea floor e.g. by a cement suspension. This has the advantage that no separate connections are required.

In relation to planning, the invention also has advantages in terms of reducing costs and saving time. As described, costly sea floor investigations must currently be carried out. The boring and/or vibrating-in and grouting technique in accordance with the invention for anchoring the coupling elements in the sea floor replaces the pile-driving process. The boring can be carried out on the sea floor e.g. under a suction bell or in the water by divers, machines or robots. It is also entirely feasible to bore and/or vibrate-in from above the surface of the water using a long guide pipe.

An advantage of this technique arises from the ability to adapt flexibly to the geological boundary conditions. By selecting suitable boring heads it is possible to bore through sand, silt and even solid rock. Owing to these positive properties, elaborate and expensive sea floor investigations are required to a much lesser degree.

The removal of sea floor samples is also reduced, thus achieving a further ecological advantage. Furthermore, sea floor sealing is limited by the manner of construction of the foundation structure. A further unique feature is that the required disassembly is easily possible.

In a particular embodiment, the pile is a bored grouted pile, in particular a bore-injection pile.

Use of the foundation structure in accordance with the invention for a foundation of an offshore wind energy plant is particularly advantageous.

The method in accordance with the invention for assembling this foundation structure is characterised in that the coupling element is first anchored by means of piles inserted in the sea floor, and the support structure is then connected to the coupling element.

According to a first alternative the coupling element is placed on the sea floor and then anchored at that location.

In a second alternative, the pile/piles is/are first inserted into the sea floor so that they terminate above the sea floor and the coupling element is then connected to the piles thus inserted and the support structure is subsequently connected to the coupling element.

The present invention is explained further with the aid of embodiments and further aspects and in conjunction with the following figures, without being limited thereto. The embodiments together with their variations and the further aspects of the invention can be combined with each other as desired, provided the association does not clearly produce the opposite result.

BRIEF DESCRIPTION OF THE DRAWINGS

FIGS. 6 to 14 show a 3-D view of coupling elements in accordance with the invention as lattice structure elements.

DESCRIPTION OF THE PREFERRED EMBODIMENTS

Figure 1:
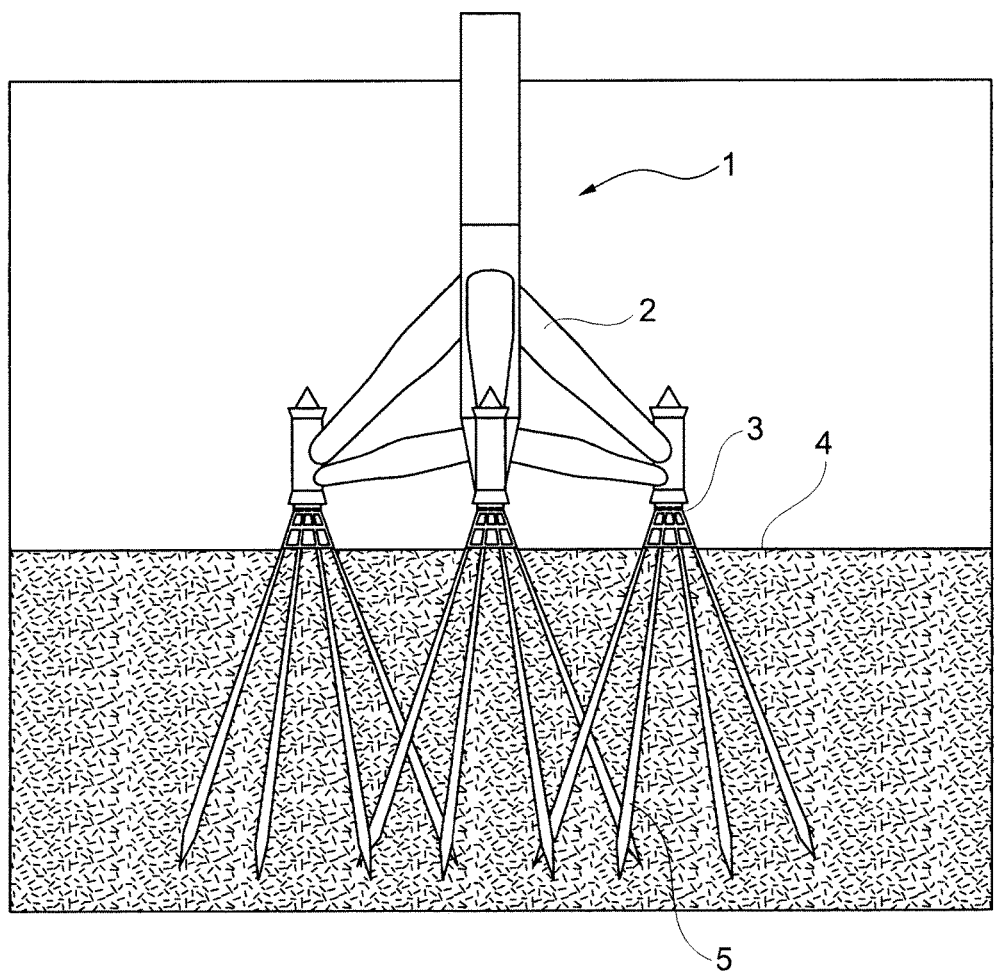
FIG. 1 shows a schematic illustration, as a side view, of a foundation structure in accordance with the invention with a coupling element and connection to a tripod.

FIG. 1 shows a side view of a foundation structure 1 in accordance with the invention with a coupling element 3 and connection to a tripod for an offshore plant which is formed as an offshore wind energy plant. The foundation structure 1 is shown, consisting of a support structure 2 formed as a tripod, coupling elements 3 and piles 5 as foundation elements on the sea floor 4. The support structure 2 is anchored on the sea floor 4 with piles 5 by means of three coupling elements 3. The piles 5 are preferably formed as grouted piles which can be inserted into the sea floor by being bored and/or by being vibrated in. The piles 5 are then fixed in the sea floor 4 with a preferably curable organic and/or inorganic material. In so doing, the piles 5 are oriented with their longitudinal extension at an angle to a vertical on the sea floor. In the present case the sea floor 4 extends horizontally so that the vertical on the sea floor 4 coincides with a vertical in space. If the sea floor 4 is inclined, a vertical on the sea floor 4 in terms of a normal to the sea floor forms an angle to a vertical in space. The angle of the pile 5 to the vertical on the sea floor 4 is 5-85°, preferably 10 to 45°. Furthermore, the pile 5 has a diameter of at least 60 mm.

The at least one pile 5 can also dissipate loads into the sea floor 4 in all spatial directions, since its longitudinal extension is oriented at an angle to the vertical on the sea floor 4. The angle is 5-85° and therefore excludes the normal to the sea floor. Preferably at least three piles 5 per coupling element 3, in the illustrated exemplified embodiment four piles 5, are disposed in the sea floor 4 in such a way that the piles 5 are oriented with their longitudinal extensions in mutually diverging directions.

The coupling elements 3 therefore form a type of adaptor to connect the piles 5 to the support structure 2. Furthermore, the coupling elements 3 are formed as lattice structure elements, in the present example in the form of a truncated pyramid as a Vierendeel structure (see also FIG. 9), wherein the lattice structure element consists of pipes with a round cross-section. In this example the corner piles 6 disposed at the four corners of the truncated pyramid advantageously serve as guide pipes for the piles 5 to anchor the three coupling elements 3 in the sea floor 4 so that separate guides, disposed on the coupling element 3, for the piles 5 are not required.

When installing the foundation structure 1, the coupling elements 3 are first placed on the sea floor 4. Then the piles 5 preferably formed as bore-injection anchors are in this example pushed through the corner piles 6 at the four corners of the truncated pyramid and anchored in the sea floor 4 by boring and grouting. The connection between the piles 5 and the coupling elements 3 can be produced so as to be releasable by means of a screw connection (not shown herein).

Alternatively provision can be made for the coupling element 3 to be disposed above the sea floor 4, preferably at a distance between 1 and 5 m, and to be anchored in the sea floor 4 by means of the at least one pile 5.

In contrast to the prior art, the support structure 2 is thus no longer anchored directly to the sea floor 4 but indirectly via coupling elements 3. After installation or anchoring of the coupling elements 3 in the sea floor 4, the support structure 2 is placed onto the coupling element 3 and connected by suitable means in a positive, non-positive and/or integrally-bonded manner.

Depending on the design of the support structure 2 and of the coupling elements 3, the piles 5 and the support structure 2 are disposed in the centre of the corresponding coupling element 3 and/or on its outsides, insides, in its centre or at the corners.

In a preferred embodiment the pile 5 is a bore-injection pile, in particular an anchor pile with a ribbed steel pipe as a support member which equally serves as a lost boring rod, as an injection pipe and as a remaining steel support member (reinforcement member). A construction steel such as e.g. S 355 J2H or S 460NH can be used as the material for the bore-injection anchor.

The method in accordance with the invention for assembling the foundation structure 1 on the sea floor 4 essentially comprises the following method steps:

positioning the foundation structure 1 in accordance with the invention on the surface of the sea floor 4, wherein this includes at least one coupling element 3 to receive components located above, such as the support structure 2, tower and turbine of an OWEP;

boring or vibrating at least one pile 5 into the sea floor 4 to anchor the coupling element 3;

injecting cement slurry, concrete, mortar or other construction materials through the injection anchor into the sea floor 4 surrounding it, thus forming a solidified area; and connecting the injection anchor to the coupling element 3.

It is also possible that first the pile or piles 5 is/are so inserted into the sea floor 4 in such a way that they terminate above the sea floor 4 and the coupling element 3 is then connected to the piles 5 thus inserted and the support structure 2 is then connected to the coupling element 3.

Figure 2:
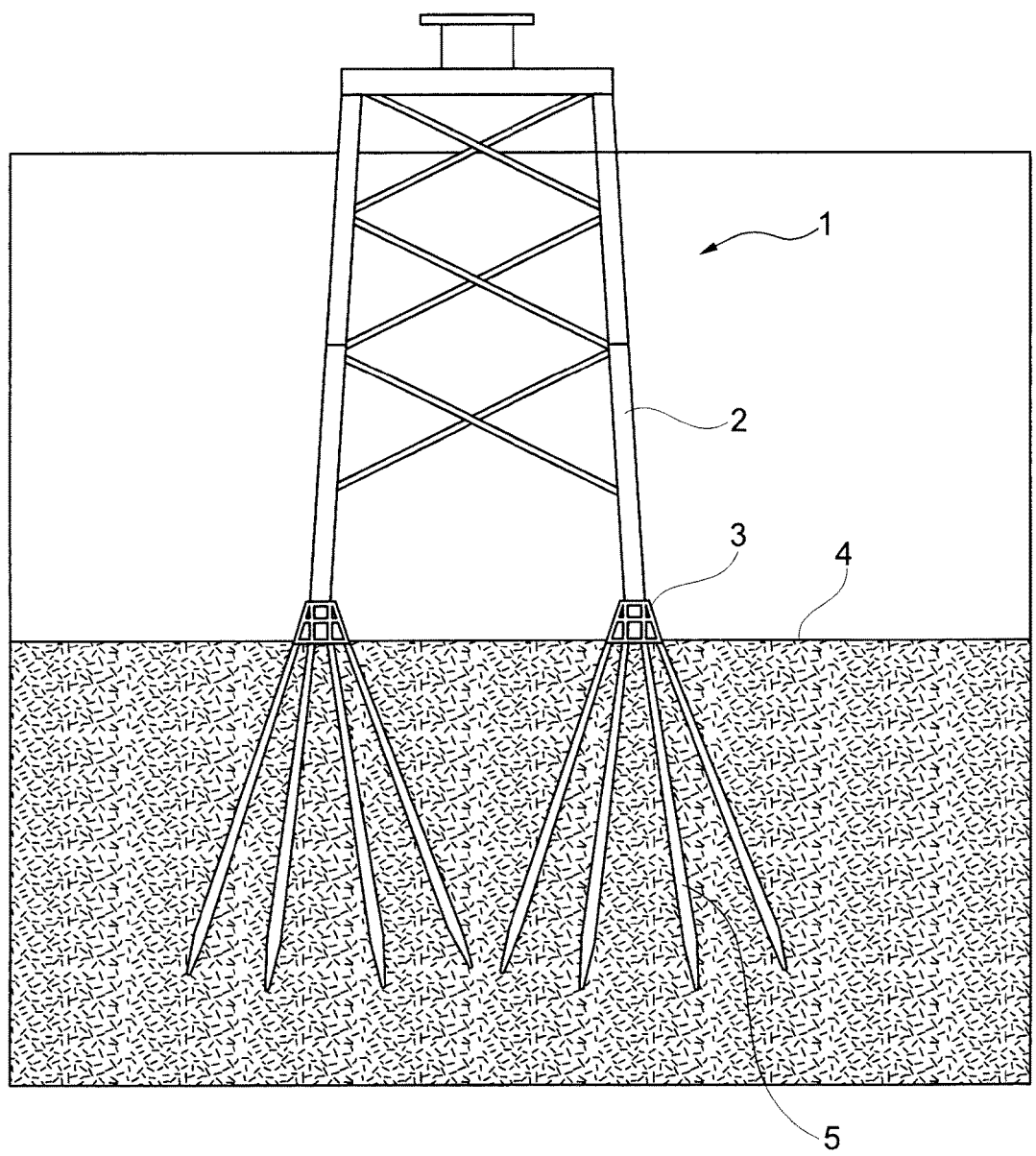
FIG. 2 shows an illustration like FIG. 1 but with connection to a jacket.

FIG. 2 shows a side view of a foundation structure 1 in accordance with the invention with connection to a jacket as a support structure 2. The construction of the foundation structure 1 and the foundation by means of the piles 5 is comparable to that in FIG. 1 so that a detailed description is not required. In contrast to the foundation of a tripod, in the present case the supports for the jacket are not placed onto the coupling elements 3 but these are disposed centrally in the coupling element 3 and connected thereto and stand directly on the sea floor 4.

Figure 3:
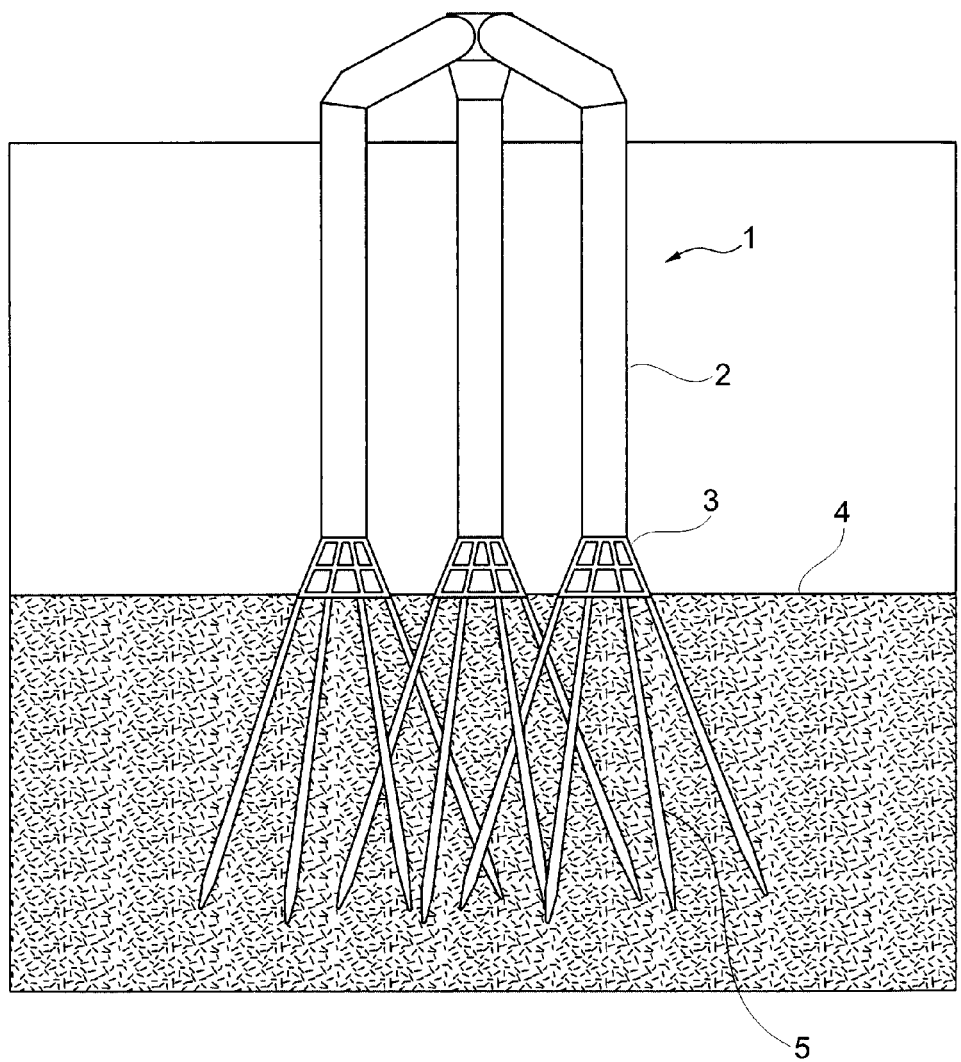
FIG. 3 shows an illustration like FIG. 1 but with connection to a tripile.
Figure 4:
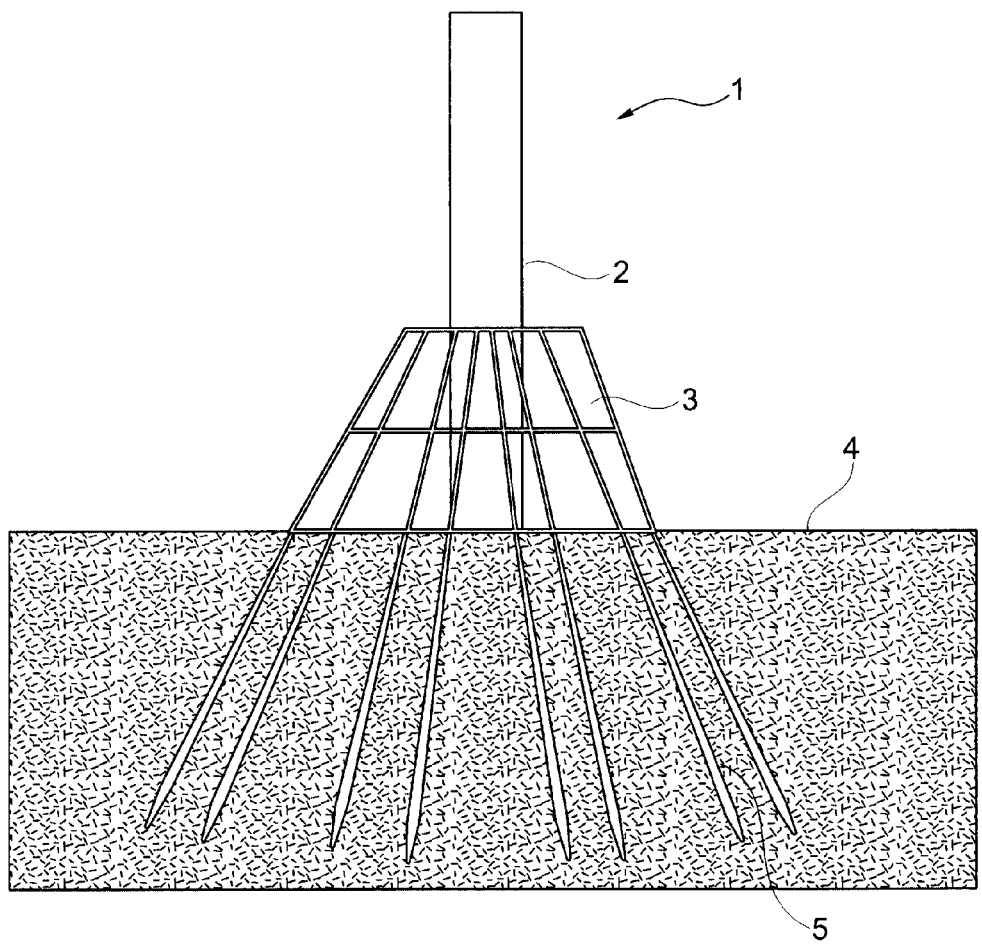
FIG. 4 shows an illustration like FIG. 1 but with connection to a monopile.

FIG. 3 shows a further possible application for a support structure 2 formed as a tripile and FIG. 4 shows a further possible application for a support structure 2 formed as a monopile.

Figure 5:
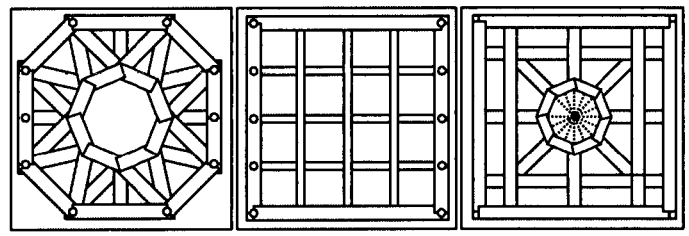
FIG. 5 shows a schematic plan view of examples of coupling elements in accordance with the invention.

FIG. 5 shows a schematic plan view of examples of basic forms of coupling elements 3 in accordance with the invention, which can be used depending on the requirements of the case. The given examples do not constitute an exhaustive list and are not limited with respect to possible further forms. The coupling elements 3 are formed as lattice structure elements with a lattice structure, formed as flat foundations, frameworks, Vierendeel systems and having triangular (not illustrated herein), circular, square or polygonal base surfaces. In the case of a circular base surface the piles 5 are preferably disposed as a circle.

FIGS. 6 to 14 show 3-D views of further embodiments of coupling elements 3 in accordance with the invention as a lattice structure element.

Figure 6:
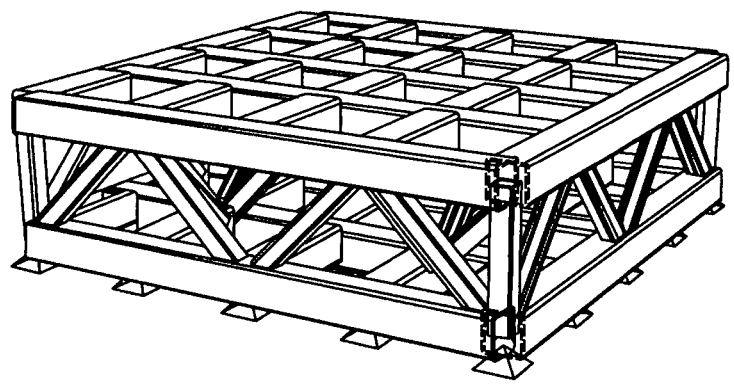

FIGS. 6 and 7 show a three-dimensional lattice structure of a cubic design for a flat foundation.

Figures 11, 12:
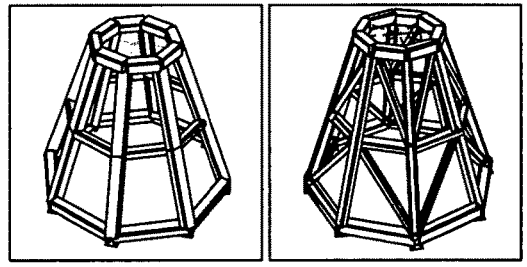

FIGS. 8 to 12 show examples of a tetrahedral embodiment (FIG. 8) and truncated pyramid embodiments (FIGS. 9 and 10) of the lattice structure elements with a framework (FIGS. 8, 10, 12) or Vierendeel system (FIGS. 9 and 11). Conical forms are also feasible.

Figure 13:
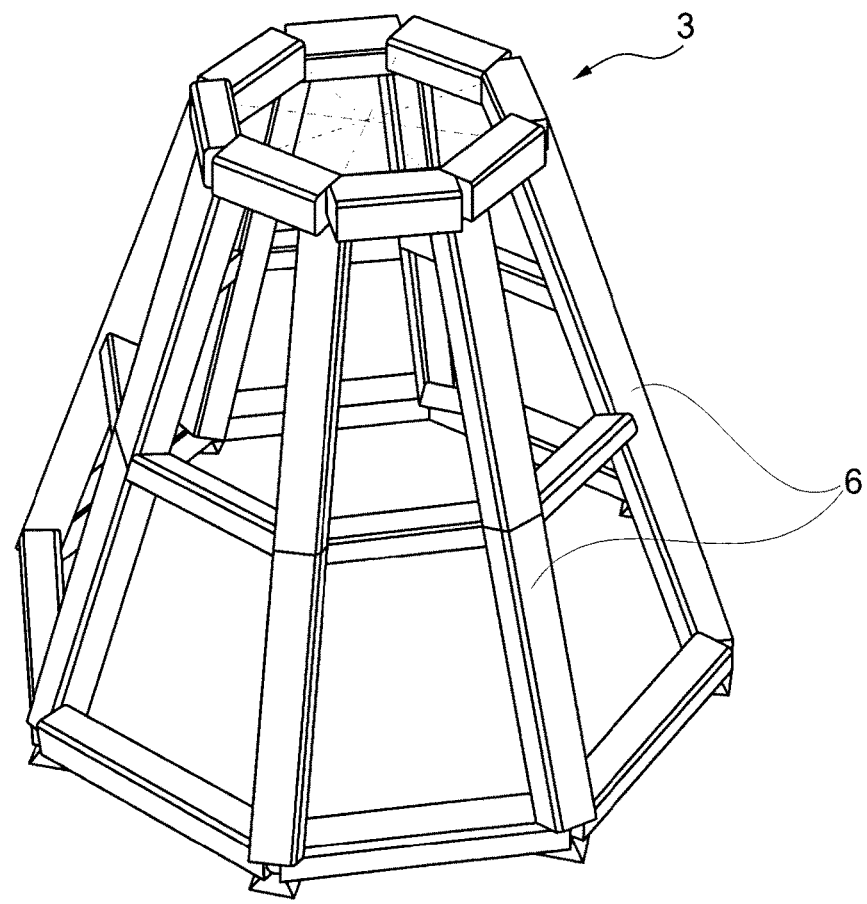
Figure 14:
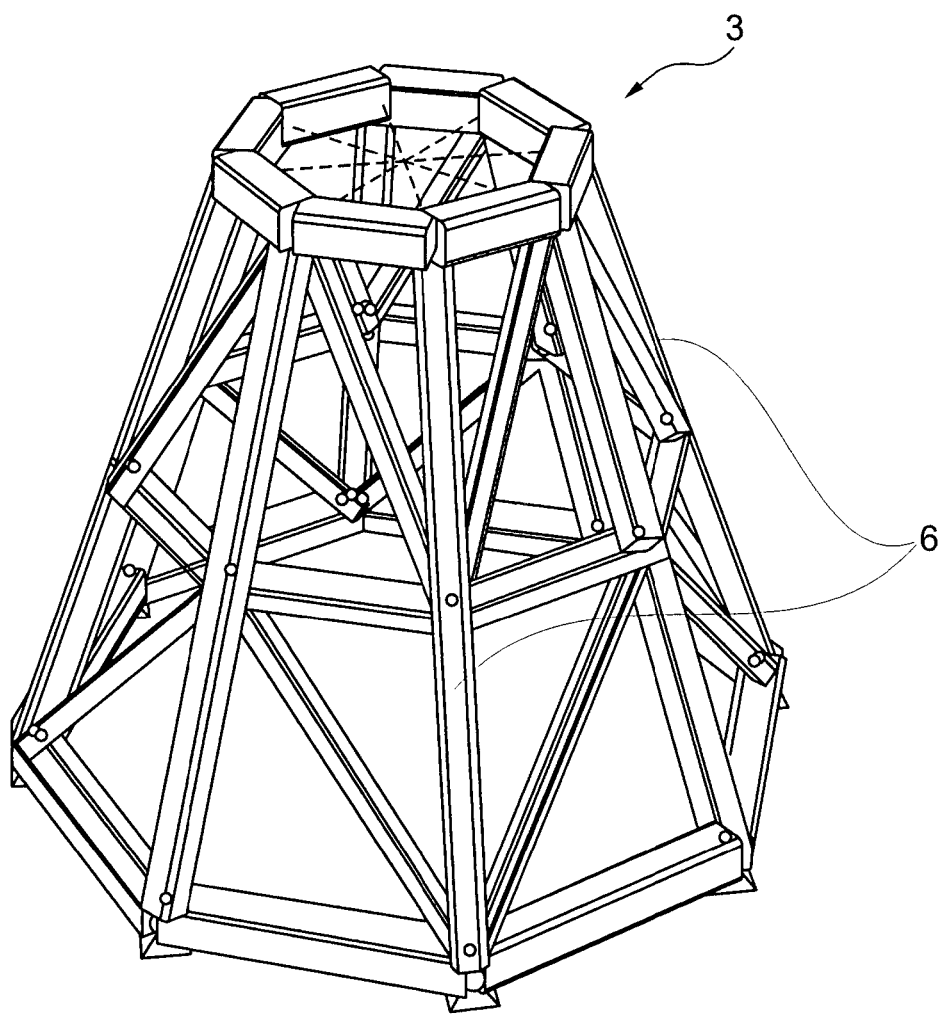

In FIGS. 13 and 14 octagonal lattice structure elements as coupling elements 3 are illustrated as further examples of the base surface. The lattice structure element as shown in FIG. 13 has a Vierendeel structure and the element shown in FIG. 14 has a framework structure. The coupling elements 3 of both lattice structure elements have, on the upper end, a central opening to receive e.g. a monopile as a support structure 2, which is passed through the opening in the coupling element 3 and is then connected thereto. In these examples the receivers for anchoring the coupling element 3 in the sea floor 4 are advantageously formed by the inclined corner piles 6 which are formed as square, so-called hollow, profiles. The bore-injection anchor is pushed through these corner piles 6 (not illustrated here) and is connected with the coupling element 3 in a releasable manner e.g. by screws, after anchoring in the sea floor 4.

In summary, the following advantages of the foundation structure 1 in accordance with the invention may be mentioned:
a) distinctly less sound emission during the installation process compared with the current state of the art,
b) distinctly greater rigidity owing to reduced underwashing depths,
c) protection of sea floor fauna and flora by greatly reduced sea floor sealing,
d) savings in cost and time by:
   material saving by means of an optimally effective structure for the foundation structure,
   less elaborate foundation site investigations,
   use of smaller installation vessels,
   simpler positioning of the foundation body owing to its reduced weight,
   longer installation time window owing to an optimised process and the selected coupling elements in accordance with the invention,
e) optimised, mutually adapted combination of coupling element and pile,
f) the foundation structure can be adapted without great outlay for most support structures currently in use.

The lattice structure element is produced from steel and/or cement or concrete and/or composite materials. The lattice structure elements are preferably pipes, in particular seamlessly hot-rolled and/or cold-formed pipes and/or as welded pipes produced from a hot strip and/or profiles with an open cross-section. The pipes have the same or a different cross-sectional geometry such as a round or angular, triangular, rectangular, square or polygonal cross-section or a combination thereof.

The present exemplified embodiment relates to offshore wind energy plants. The foundation structure 1 in accordance with the invention can also be used generally for offshore platforms such as so-called drilling islands.

REFERENCE LIST

1 Foundation structure
2 Support structure
3 Coupling element
4 Sea floor
5 Pile
6 Corner pile

The invention claimed is:

1. A foundation structure for an offshore plant having at least one foundation element which can be anchored to the sea floor, precluding a gravity foundation and precluding a floating foundation, and a support structure to fix the offshore plant, wherein the foundation element is formed as a pile which can be inserted into the sea floor by being bored and/or vibrated in, which can be fixed in the sea floor with an organic and/or inorganic material, wherein the at least one pile and the support structure are connected to each other via a force-transferring coupling element, and wherein the coupling element is formed as a lattice structure element, wherein the at least one pile and the support structure are releasably connected to each other via the coupling element;
   wherein the coupling element is separate from the at least one pile and the support structure prior to being releasably connected whereby the coupling element is connectable to the support structure after the at least one pile is inserted into the sea floor, and wherein the coupling element is disposed vertically above the at least one pile when fixed by the at least one pile.

2. The foundation structure as claimed in claim 1, wherein the at least one pile is arranged at an angle to a vertical on the sea floor, and wherein the angle of the pile to the vertical is 5-85°.

3. The foundation structure as claimed in claim 2, wherein the angle of the pile to the vertical is 10 to 45°.

4. The foundation structure as claimed in claim 1, wherein the pile has a diameter of at least 60 mm.

5. The foundation structure as claimed in claim 1, wherein the at least one pile dissipates loads into the sea floor in all spatial directions.

6. The foundation structure as claimed in claim 1, wherein the foundation element consists of a plurality of piles.

7. The foundation structure as claimed in claim 6, wherein in order to increase the loads which can be transferred into the sea floor, at least three piles are arranged in the sea floor in such a way that their longitudinal extensions are in three mutually diverging directions.

8. The foundation structure as claimed in claim 1, wherein the at least one pile is arranged at an angle to a vertical on the sea floor.

9. The foundation structure as claimed in claim 1, wherein the connection between the coupling element and support structure and the connection between the coupling element and the at least one pile is formed in an integrally-bonded and/or non-positive and/or positive manner.

10. The foundation structure as claimed in claim 1, wherein the lattice structure element comprises pipes.

11. The foundation structure as claimed in claim 10, wherein the pipes have the same or a different cross-sectional geometry being round or angular, triangular, rectangular, square or polygonal cross-section or a combination thereof.

12. The foundation structure as claimed in claim 10, wherein the lattice structure element comprises seamlessly hot-rolled and/or cold-formed pipes and/or welded pipes produced from a hot strip and/or profiles with an open cross-section.

13. The foundation structure as claimed in claim 1, wherein the lattice structure element has an angular base surface with corner piles which are disposed in the corners, wherein the corner piles are configured to be supported on the sea floor and serve as receivers for guiding the piles that are being pushed through the corner piles.

14. The foundation structure as claimed in claim 1, wherein the lattice structure element has a circular, triangular, rectangular or polygonal base surface.

15. The foundation structure as claimed in claim 14, wherein in the case of a circular base surface the piles are disposed as a circle.

16. The foundation structure as claimed in claim 1, wherein the lattice structure element is produced from steel and/or cement or concrete and/or composite materials.

17. The foundation structure as claimed in claim 1, wherein the lattice structure element is of a cubic design or a design as a truncated tetrahedron, a cone or truncated pyramid.

18. The foundation structure as claimed in claim 1, wherein the lattice structure element has a Vierendeel, frame or framework structure.

19. The foundation structure as claimed in claim 1, wherein the coupling element lies on the sea floor and configured to be anchored in the sea floor by means of the at least one pile.

20. The foundation structure as claimed in claim 1, wherein the coupling element is disposed above the sea floor and configured to be anchored in the sea floor by means of the at least one pile.

21. The foundation structure as claimed in claim 20, wherein the coupling element is disposed above the sea floor at a distance between 1 and 5 m.

22. The foundation structure as claimed in claim 1, wherein the pile is a bored grouted pile.

23. The foundation structure as claimed in claim 1, wherein the foundation structure is a foundation for an offshore wind energy plant.

24. A method for assembling a foundation structure on a sea floor, said method comprising:
providing at least one foundation element which can be anchored to the sea floor, precluding a gravity foundation and precluding a floating foundation, wherein the foundation element is formed as a pile which can be inserted into the sea floor by being bored and/or vibrated in, and which can be fixed in the sea floor with an organic and/or inorganic material;
providing a support structure to fix the offshore plant;
providing a force-transferring coupling element for connecting the at least one pile and the support structure to each other, wherein the coupling element is formed as a lattice structure element, and wherein the at least one pile and the support structure are configured to be releasably connected to each other via the coupling element, wherein the coupling element is separate from the at least one pile and the support structure prior to being releasably connected whereby the coupling element is connectable to the support structure after the at least one pile is inserted into the sea floor, and wherein the coupling element is disposed vertically above the at least one pile when fixed by the at least one pile; and
first anchoring the coupling element to the sea floor by means of the at least one pile inserted in the sea floor, and then connecting the support structure to the coupling element.

25. The method as claimed in claim 24, wherein the coupling element is placed on the sea floor and is then anchored.

26. The method as claimed in claim 24, wherein one or more piles are first inserted into the sea floor so that they terminate above the sea floor and the coupling element is then connected to the piles thus inserted and the support structure is subsequently connected to the coupling element.

* * * * *

UNITED STATES PATENT AND TRADEMARK OFFICE
CERTIFICATE OF CORRECTION

PATENT NO. : 9,663,916 B2  
APPLICATION NO. : 14/376050  
DATED : May 30, 2017  
INVENTOR(S) : Denker et al.

Page 1 of 1

It is certified that error appears in the above-identified patent and that said Letters Patent is hereby corrected as shown below:

In the Specification

Column 2  
Line 30, "fur" should be --für--  
Line 31, "and" should be --und--  
Line 32, "fur" should be --für--

Signed and Sealed this  
Twenty-fifth Day of July, 2017

Joseph Matal  
*Performing the Functions and Duties of the*  
*Under Secretary of Commerce for Intellectual Property and*  
*Director of the United States Patent and Trademark Office*